United States Patent
Döring et al.

(10) Patent No.: US 10,174,692 B2
(45) Date of Patent: Jan. 8, 2019

(54) METHOD FOR OPERATING AN INTERNAL COMBUSTION ENGINE

(71) Applicant: MAN DIESEL & TURBO SE, Augsburg (DE)

(72) Inventors: Andreas Döring, Muenchen/Unterhaching (DE); Matthias Auer, Munich (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 14/915,970

(22) PCT Filed: Sep. 2, 2014

(86) PCT No.: PCT/EP2014/002374
§ 371 (c)(1),
(2) Date: Jun. 1, 2016

(87) PCT Pub. No.: WO2015/032487
PCT Pub. Date: Mar. 12, 2015

(65) Prior Publication Data
US 2016/0273463 A1    Sep. 22, 2016

(30) Foreign Application Priority Data

Sep. 4, 2013   (DE) .......... 10 2013 014 674

(51) Int. Cl.
*G01M 15/11*   (2006.01)
*F02D 41/00*   (2006.01)
(Continued)

(52) U.S. Cl.
CPC ....... *F02D 41/008* (2013.01); *F02D 41/1438* (2013.01); *F02D 41/1443* (2013.01);
(Continued)

(58) Field of Classification Search
CPC .............. F02D 41/008; F02D 41/0082; F02D 2200/1015; G01M 15/104; G01M 15/11
(Continued)

(56) References Cited

U.S. PATENT DOCUMENTS 3,983,754 A    10/1976   Deguchi et al.
4,601,809 A *  7/1986   Kitahara ........... G01N 27/4065
                                              123/693
(Continued)

FOREIGN PATENT DOCUMENTS

AT    506 085    6/2009
AT    506085     6/2009
(Continued)

OTHER PUBLICATIONS

Li et al. "Real time NO emissions measurement during cold start in LPG SI engine", Energy Conversion and Management, Elsevier Science Publishers, Oxford GB, vol. 48, No. 9, Jul. 28, 2007 pp. 2508-2516, XP022174630.

(Continued)

*Primary Examiner* — Erick Solis
(74) *Attorney, Agent, or Firm* — Cozen O'Connor

(57) ABSTRACT

Method for the operation of an internal combustion engine having a plurality of cylinders (11 to detect misfires. An exhaust gas sensor at the exhaust gas of every cylinder of the internal combustion engine measures at least one actual exhaust gas value individually for the respective cylinder, and the respective measured actual exhaust gas value is compared with a reference exhaust gas value to determine at least one cylinder-specific deviation between the reference exhaust gas value and the actual exhaust gas value for each of the cylinders. It is determined for every cylinder based on
(Continued)

the cylinder-specific deviation or based on every cylinder-specific deviation whether or not misfires are occurring at the respective cylinder.

12 Claims, 2 Drawing Sheets

(51) Int. Cl.
    *G01M 15/10* (2006.01)
    *F02D 41/14* (2006.01)

(52) U.S. Cl.
    CPC ..... *F02D 41/1454* (2013.01); *F02D 41/1461* (2013.01); *G01M 15/104* (2013.01); *G01M 15/106* (2013.01); *G01M 15/11* (2013.01); *F02D 41/146* (2013.01); *F02D 41/1466* (2013.01); *F02D 2041/147* (2013.01); *F02D 2200/1015* (2013.01)

(58) Field of Classification Search
    USPC ............. 123/673, 406.14, 406.27; 73/114.02
    See application file for complete search history.

(56) References Cited

U.S. PATENT DOCUMENTS

| | | | |
|---|---|---|---|
| 5,651,353 A | 7/1997 | Allston | |
| 5,947,077 A | 9/1999 | Yonezawa et al. | |
| 6,314,952 B1* | 11/2001 | Turin | F02D 41/0085 123/673 |
| 6,499,474 B2* | 12/2002 | Wachi | F02D 41/1474 123/443 |
| 7,031,828 B1 | 8/2006 | Thompson et al. | |
| 7,280,906 B2* | 10/2007 | Schneider | F02D 41/1454 123/690 |
| 9,200,981 B2* | 12/2015 | Horlbeck | F02D 41/1497 |
| 2005/0121010 A1 | 6/2005 | Kita et al. | |
| 2009/0234562 A1* | 9/2009 | Wolf | F02D 41/0072 701/108 |
| 2013/0268177 A1* | 10/2013 | Wu | F02D 41/0085 701/103 |
| 2014/0352659 A1* | 12/2014 | Glugla | F02D 41/0082 123/350 |

FOREIGN PATENT DOCUMENTS

| | | |
|---|---|---|
| CN | 101435741 | 5/2009 |
| DE | 2528 785 | 2/1976 |
| DE | 102006016020 | 2/2007 |
| DE | 102008033320 | 3/2010 |
| DE | 102009000298 | 7/2010 |
| DE | 202013003006 | 4/2013 |
| EP | 0466849 | 1/1992 |
| EP | 2 058 495 | 5/2009 |
| JP | 51-7305 | 1/1976 |
| JP | 01-203622 | 8/1989 |
| JP | 04-103854 | 4/1992 |
| JP | 07-269407 | 10/1995 |
| JP | 09-303189 | 11/1997 |
| JP | 28-85813 B2 | 4/1999 |
| JP | 2009-121475 | 6/2009 |
| JP | 2010-230016 | 10/2010 |
| WO | WO 90/02874 | 3/1990 |
| WO | WO 2007/028960 | 3/2007 |
| WO | WO 2010/119028 | 10/2010 |
| WO | WO 2014/152794 | 9/2014 |

OTHER PUBLICATIONS

Office Action translation dated May 27, 2017 which issued in the corresponding Chinese Patent Application No. 201480060833.5.
Office Action dated Jun. 5, 2017 which issued in the corresponding Korean Patent Application No. 10-2016-7008831.
Office Action dated Mar. 2, 2018 which issued in the corresponding Korean Patent Application No. 10-2016-7008831.
Office Action dated Feb. 12, 2018 which issued in the corresponding Chinese Patent Application No. 201480060833.5.
Office Action dated Sep. 5, 2018 issued in the corresponding Chinese Patent Application No. 201480060833.5.

* cited by examiner

METHOD FOR OPERATING AN INTERNAL COMBUSTION ENGINE

CROSS REFERENCE TO RELATED APPLICATIONS

This is a U.S. national stage of application No. PCT/EP2014/002374, filed on Mar. 2, 2016. Priority is claimed on German Application No.: DE102013014674.7, filed Sep. 4, 2013, the content of which is/are incorporated here by reference.

BACKGROUND OF THE INVENTION

1. Field of the Invention

The invention is directed to a method for the operation of an internal combustion engine having a plurality of cylinders, namely, a method for cylinder-specific detection of misfires.

2. Description of the Prior Art

Internal combustion engines must meet increasingly stricter emission limit values. One possibility for meeting these emission limit values is to optimize the operation of the internal combustion engine by a control. In this regard, it is also already known in an internal combustion engine to control the individual cylinders of the internal combustion engine individually. Another option for meeting these emission limit values is guiding exhaust gas of the internal combustion engine through an exhaust gas aftertreatment system in order to reduce emissions of exhaust gas components such as soot, CO, NOx or hydrocarbons.

Exhaust gas aftertreatment systems known from practice have a high oxidation capacity for hydrocarbons. Because the oxidation of hydrocarbons takes place exothermally, excessive concentrations of hydrocarbons in the exhaust gas can cause thermal damage to the exhaust gas aftertreatment system.

High concentrations of hydrocarbons in the exhaust gas that lead to thermal damage to an exhaust gas aftertreatment system may be caused, for example, by misfiring of cylinders in the internal combustion engine because, during misfires of this type, the fuel introduced into these cylinders reaches the exhaust gas aftertreatment system without being combusted. In this case, there is a particularly high risk of damage to the exhaust gas aftertreatment system.

Misfires of this type are especially critical in gas engines that have oxidation catalytic converters, e.g., $CH_4$ oxidation catalytic converters or $CH_2O$ oxidation catalytic converters, in the region of the exhaust gas aftertreatment system. Oxidation catalytic converters of this kind are exposed to a particularly high risk of damage from misfires in cylinders of a gas engine.

Therefore, it is important to detect misfires in cylinders in an internal combustion engine.

A device by which misfires in an internal combustion engine can be detected is known from DE 25 28 785 A1. Temperature sensors are used for this purpose. However, temperature sensors are not capable of safely detecting sporadically occurring misfires because the thermal inertia of temperature sensors is too high. On the contrary, temperature sensors can only be used to detect a persistently malfunctioning cylinder. However, it is precisely during sporadic misfires of cylinders in an internal combustion engine that large temperature increases can occur in the region of an exhaust gas aftertreatment system in catalytic converters of the exhaust gas aftertreatment system, which leads to damage of these catalytic converters. Therefore, it is important that sporadic misfires can also be safely and reliably detected.

SUMMARY OF THE INVENTION

The present invention provides a novel method for operating an internal combustion engine by which detection of misfires can be facilitated.

According to one aspect of the invention, by at least one exhaust gas sensor at the exhaust gas of every cylinder of the internal combustion engine, at least one actual exhaust gas value is measured individually for each respective cylinder, and the respective measured actual exhaust gas value is compared with a reference exhaust gas value to determine at least one cylinder-specific deviation between the reference exhaust gas value and the actual exhaust gas value for each of the cylinders, and it is determined individually for every cylinder based on the cylinder-specific deviation or based on every cylinder-specific deviation whether a misfire has occurred in the respective cylinder.

According to one aspect of the present invention, the exhaust gas of every cylinder of the internal combustion engine be examined by measuring techniques individually by at least one exhaust gas sensor and that at least one actual exhaust gas value is detected from the exhaust gas of every cylinder using measuring techniques. If misfiring is occurring at a respective cylinder, this can be detected by comparing the actual exhaust gas value of every cylinder with a corresponding reference exhaust gas value. Sporadic misfires can also be reliably detected by actual exhaust gas values detected in a cylinder-specific manner from the exhaust gas of the cylinder. Preferably, a NOx amount or a NOx concentration or an oxygen content in the exhaust gas are detected as actual exhaust gas values in the exhaust gas of every cylinder by at least one exhaust gas sensor formed as an NOx sensor or as a lambda sensor. Sporadic misfires can be determined in a particularly reliable manner in this way. Preferably, for every cylinder, the actual exhaust gas value of the other cylinders or an average value of the actual exhaust gas values of the other cylinders serves as reference exhaust gas value. This makes it possible to detect sporadic, cylinder-specific misfires in a particularly simple and reliable manner.

Preferably, when misfires occur at a cylinder, a fuel supply to this cylinder is interrupted and/or an ignition time at this cylinder is influenced and/or a fuel/air ratio at this cylinder is influenced. These steps can counteract risk of damage to the exhaust gas aftertreatment system due to misfiring.

According to a first advantageous aspect of the invention, the actual exhaust gas value or every actual exhaust gas value is measured by at least one cylinder-specific exhaust gas sensor for every cylinder, and the respective actual exhaust gas value is acquired at the respective exhaust gas sensor of the respective cylinder exclusively in a cylinder-specific crankshaft angle range so as to minimize an interaction with the exhaust gas expelled from other cylinders during the cylinder-specific acquisition of the actual exhaust gas value.

According to one aspect of the invention, the actual exhaust gas value or every actual exhaust gas value is measured by a shared exhaust gas sensor for a plurality of cylinders, and the exhaust gas of always exclusively one cylinder is supplied to the shared exhaust gas sensor of a plurality of cylinders so as to minimize an interaction with the exhaust gas expelled from other cylinders during the cylinder-specific acquisition of the actual exhaust gas value.

Aspects of the invention allow cylinder-specific actual exhaust gas values, particularly the exhaust gas concentration values, to be exactly determined using measurement techniques, specifically without the risk that the measurement of an actual exhaust gas value taken from the exhaust gas of a cylinder will be impaired by an interaction with the exhaust gas expelled by other cylinders.

According to one aspect of the invention, an actual NOx value is acquired as actual exhaust gas value for every cylinder by an exhaust gas sensor configured as a NOx sensor. In addition or alternatively, a fuel-air ratio or residual oxygen content is acquired as actual exhaust gas value for every cylinder by an exhaust gas sensor configured as a lambda sensor. The measurement of the cylinder-specific actual exhaust gas value via NOx sensors or lambda sensors is preferred.

BRIEF DESCRIPTION OF THE DRAWINGS

Preferred further developments of the invention are indicated in the subclaims and the following description. Embodiment examples of the invention are described more fully with reference to the drawings without the invention being limited to these embodiment examples. The drawings show:

DETAILED DESCRIPTION OF THE PRESENTLY PREFERRED EMBODIMENTS

The invention is directed to a method for operating an internal combustion engine, namely a method for cylinder-specific detection of misfires at the cylinders of an internal combustion engine, particularly in a ship's engine formed as gas engine.

Figure 1:
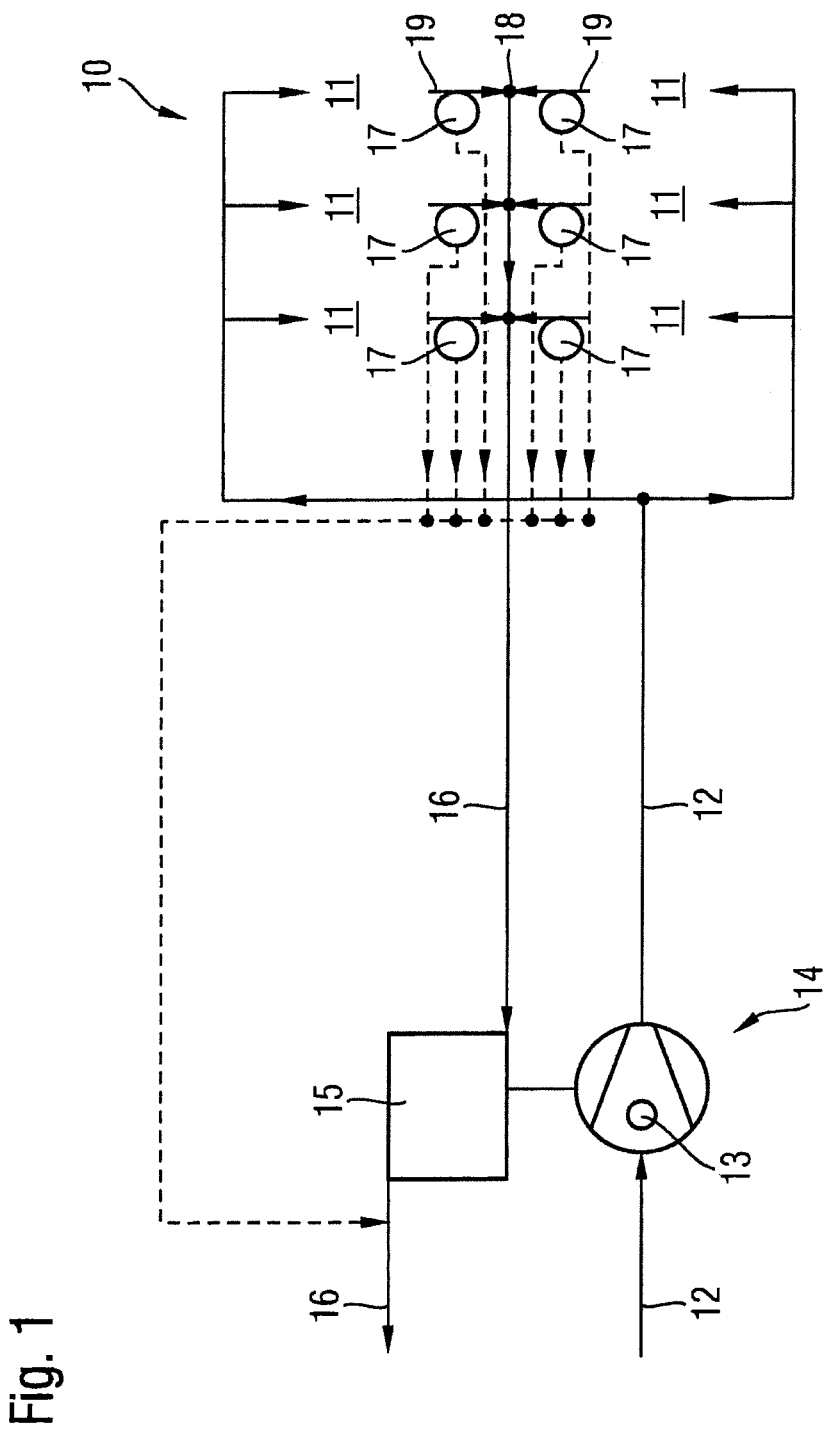
FIG. 1 is a schematic view of an internal combustion engine.

FIG. 1 shows a highly schematic diagram of an internal combustion engine 10 with a plurality of cylinders 11. The quantity of six cylinders 11 shown in FIG. 1 and the grouping of these cylinders 11 into two cylinder groups is purely exemplary.

Charge air can be supplied to the cylinders 11 of the internal combustion engine 10 proceeding from a charge air line 12. In the embodiment example shown in FIG. 1, the charge air is compressed in a compressor 13 of an exhaust gas turbocharger 14. Energy required for this purpose is obtained in a turbine 15 of the exhaust gas turbocharger in that exhaust gas exiting the cylinders 11 of the internal combustion engine 10 is expanded in the turbine 15. Accordingly, the exhaust gas exiting the cylinders 11 can be fed to the turbine 15 of the exhaust gas turbocharger 14 via an exhaust gas line 16. Providing an exhaust gas turbocharger 14 of this type is preferable, but optional. An exhaust gas aftertreatment system is provided downstream of the turbine 15 of the exhaust gas turbocharger 14.

Within the meaning of the present invention, it is suggested that a cylinder-specific detection of misfires is established at an internal combustion engine 10. For this purpose, by at least one exhaust gas sensor 17 measures the exhaust gas of every cylinder 11, at least one actual exhaust gas value is measured individually for the respective cylinder 11. This respective measured actual exhaust gas value of the respective cylinder 11 is compared with a corresponding reference exhaust gas value so that a cylinder-specific deviation between the reference exhaust gas value and the measured actual exhaust gas value is determined for the respective cylinder. Based on this cylinder-specific deviation, it is determined individually for every cylinder 11 whether there is misfiring at the respective cylinder.

According to FIG. 1, an individual exhaust gas sensor 17 is associated with every cylinder 11 of the internal combustion engine 10. Viewed in the flow direction of the exhaust gas, every cylinder-specific exhaust gas sensor 17 is arranged downstream of the respective cylinder 11 and upstream of a combining point 18 of a cylinder-specific exhaust gas outlet channel 19 and the exhaust gas line 16. It is also possible for the exhaust gas sensors 17 to project into combustion chambers of the cylinders 11.

In the region of every cylinder-specific exhaust gas sensor 17, the exhaust gas of the respective cylinder 11 is subjected to a cylinder-specific measurement to determine at least one cylinder-specific actual exhaust gas value for every cylinder 11. In so doing, it is provided that the respective actual exhaust gas value is acquired exclusively in a cylinder-specific crankshaft angle range at the respective exhaust gas sensor 17 of the respective cylinder 11 to minimize interaction with the exhaust gas expelled by other cylinders during the cylinder-specific acquisition of the actual exhaust gas values or, if feasible, even to completely prevent any overlap between outlet valves.

Since the outlet valves of the individual cylinders 11 open in different crankshaft angle ranges and accordingly carry off exhaust gas from the respective cylinders 11 in different crankshaft angle ranges, the exhaust gas of other cylinders can be prevented from impairing this actual value detection during acquisition of cylinder-specific actual exhaust gas values.

According to FIG. 1, the exhaust gas conducted via the cylinder-specific exhaust gas sensors 17 is guided downstream of the turbine 15 into the exhaust gas line 16 viewed in flow direction of the exhaust gas. This has the advantage that exhaust gas always flows from the individual cylinders via the exhaust gas sensors in downstream direction of the exhaust gas turbine because of the pressure drop via the turbocharger. The embodiment form in FIG. 1 is preferred to ensure a sufficient accuracy in the cylinder-selective detection of misfires in relatively fast-running internal combustion engines.

Figure 2:
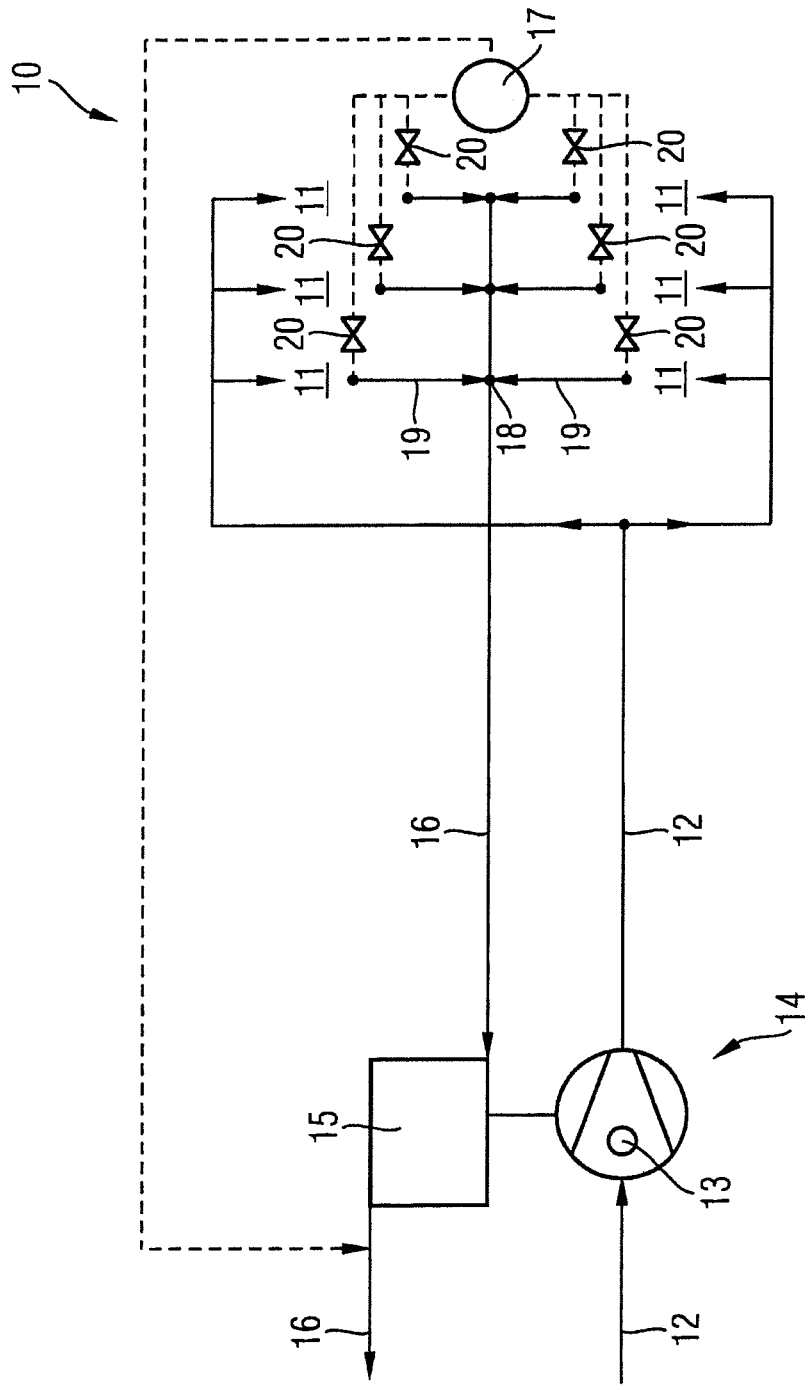
FIG. 2 is a schematic view of a further internal combustion engine.

FIG. 2 shows an alternative embodiment in which a shared exhaust gas sensor 17 is provided for determining the cylinder-specific actual exhaust gas values for the cylinders 11. This exhaust gas sensor 17 is coupled in each instance with the cylinder-specific exhaust gas outlet channels 19 with the intermediary of valves 20 so that the exhaust gas of exclusively one cylinder 11 is always supplied to the shared exhaust gas sensor 17. The control of the valves 20 is carried out again depending on the cylinder-specific crankshaft angle range so that when the outlet valves of the respective cylinder 11 expel exhaust gas, exhaust gas of the respective cylinder 11 is supplied to the shared exhaust gas sensor 17 in that the valve 20 associated with this respective cylinder 11 opens. Also, in the embodiment example in FIG. 2, the exhaust gas guided via the shared exhaust gas sensor 17 is guided into the exhaust gas line 16 downstream of the turbine 15 of the exhaust gas turbocharger 14.

The embodiment form in FIG. 2 is preferred in relatively slow-running internal combustion engines. In relatively slow-running internal combustion engines, a sufficient accuracy in cylinder-selective detection of misfires can also be ensured with a single exhaust gas sensor due to the low frequencies of the exhaust strokes of the individual cylinders.

In the variants in FIGS. 1 and 2, running times of the exhaust gas from the cylinders 11 to the exhaust gas sensors 17 can be taken into account when acquiring the actual value.

The cylinder-specific exhaust gas sensors 17 in FIG. 1 and the shared exhaust gas sensor 17 in FIG. 2 used, respectively, for the cylinder-specific determination of an actual exhaust gas value are preferably NOx sensors and/or lambda sensors. When NOx sensors are used as exhaust gas sensors 17 in FIG. 1 and an NOx sensor is used as shared exhaust gas sensor in FIG. 2, actual NOx values are used as cylinder-specific actual exhaust gas values, and both NOx concentrations and NOx amounts can be determined. When a lambda sensor is used as exhaust gas sensors 17 in FIG. 1 or as shared exhaust gas sensor 17 in FIG. 2, fuel/air ratios and residual oxygen contents are preferably determined as cylinder-specific actual exhaust gas values.

Although NOx sensors or lambda sensors are preferably used, $CH_4$ sensors or $H_2$ sensors or soot sensors can also be used as exhaust gas sensors in connection with the cylinder-selective detection of misfires.

During the measurement of the actual exhaust gas values, it is possible either to use the current measurement of the actual exhaust gas value or to determine an average value or a maximum value or a time integral from measurements of the actual exhaust gas value acquired over a measurement interval and to use this value as cylinder-specific actual exhaust gas value. It is also possible to use an inflection point within a measurement interval as cylinder-specific actual exhaust gas value. In relatively fast-running internal combustion engines, the use of average values as actual exhaust gas values is preferred. In relatively slow-running internal combustion engines, maximum values or time integrals or inflection points are preferably used as actual exhaust gas values.

A plurality of actual exhaust gas values can also be determined for every cylinder 11 to compare with corresponding reference exhaust gas values and, depending thereon, to carry out the cylinder-specific detection of misfires.

In this respect, actual NOx values can be determined in connection with actual values of the residual oxygen content or fuel/air ratio and compared to corresponding reference values. In this connection, NOx sensors and lambda sensors can form a unit which cannot be disconnected without destroying it.

According to another advantageous further development of the invention, it is provided that reference exhaust gas values which depend on the operating point of the internal combustion engine 10 are used as reference exhaust gas values for the cylinders 11 of the internal combustion engine 10. Accordingly, it is possible to provide different reference exhaust gas values for the cylinders 11 of the internal combustion engine 10 for a full load operation and a partial load operation of the internal combustion engine 10.

For a cylinder, the actual exhaust gas values of the other cylinders are used as reference exhaust gas value. For example, it is possible to use as reference exhaust gas value for a cylinder an average value of the actual exhaust gas values of the other cylinders. If a serious deviation exceeding a threshold value is determined between the respective actual exhaust gas value and the respective reference exhaust gas value for a cylinder, it is assumed that this cylinder is misfiring.

When the presence of cylinder-selective misfires is detected at a cylinder in an internal combustion engine, the result is stored at least in an engine control device so as to read out this result during subsequent maintenance and to initiate appropriate maintenance steps for the respective cylinder.

According to an advantageous further development of the invention, it is provided that when misfires are detected at a cylinder, a fuel supply to this cylinder is interrupted and/or an ignition time at this cylinder is influenced and/or a fuel/air ratio at this cylinder is influenced. This can counteract an impermissibly large increase in temperature in the region of an exhaust gas aftertreatment system downstream of the internal combustion engine 10.

The exhaust gas sensors used for cylinder-selective detection of misfires are subject to an aging process in operation such that a measurement characteristic of the respective exhaust gas sensor changes over the period of operation. Therefore, it is provided according to another advantageous further development of the invention to calibrate the exhaust gas sensor or every exhaust gas sensor.

At the start of a calibration of an exhaust gas sensor, all of the exhaust gas is removed from the exhaust gas sensor by applying a reference gas to the respective exhaust gas sensor. During the calibration of the respective exhaust gas sensor, reference gas continues to be applied to this exhaust gas sensor in order to prevent this exhaust gas sensor from admitting exhaust gas during the calibration. After the calibration, exhaust gas can again be applied to the calibrated exhaust gas sensor.

In an internal combustion engine with fuel cut-off, i.e., in an internal combustion engine in which no fuel is combusted in the cylinders of the internal combustion engine in overrun mode, charge air can be applied to the exhaust gas sensors for calibration, and charge air is then used as reference gas. The oxygen content of the charge air corresponds to the oxygen content of the ambient air so that lambda sensors, for example, can then be calibrated in a simple and reliable manner using charge air as reference gas.

When an exhaust gas sensor which is to be calibrated is arranged in a corresponding measurement space, exhaust gas is removed from the measurement space prior to calibration by filling the measurement space with the reference gas. As has already been stated, the measurement space is continuously refilled with reference gas under a defined pressure during the entire calibration in order to prevent exhaust gas from entering the measurement space during the calibration. After the calibration is terminated, exhaust gas can again be introduced directly into the measurement space of the respective exhaust gas sensor in order to remove the reference gas from the measurement space and use the exhaust gas sensor again for actual measurements.

When the exhaust gas sensor to be calibrated is positioned in a measurement space, this measurement space can be shielded from the exhaust gas channel via a gas-permeable membrane, for example. Calibrating gas can then be introduced into the measurement space via a reference gas line leading to the measurement space, and exhaust gas located in the measurement space is displaced into the exhaust gas channel through the gas-permeable membrane. During the calibration, a defined amount of calibrating gas is always guided into the measurement space to ensure that no exhaust gas reaches the measurement space via the membrane. At the conclusion of calibration, the supply of calibrating gas via the reference gas line is stopped so that exhaust gas can again enter the measurement space through the gas-permeable membrane so that the exhaust gas sensor can again be used for normal measurement operation. To ensure an accelerated penetration of exhaust gas into the measurement space of the respective exhaust gas sensor, the reference gas can be extracted from the respective measurement space via the reference gas line leading to the respective measurement space. A separate suction line may also be provided for extracting the reference gas from the measurement space of the respective sensor. An extraction process of this kind for the reference gas can be carried out in a controlled manner, for example, via an existing suction line of an engine intake system in conjunction with a controllable valve in a suction line leading to the respective measurement space of the respective exhaust gas sensor.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for cylinder-specific detection of misfires in an internal combustion engine having a plurality of cylinders and at least one exhaust gas sensor at an exhaust gas outlet of one or more of the plurality of cylinders, comprising:
    calibrating the at least one exhaust gas sensor, the at least one exhaust gas sensor configured as one of an $NO_x$ sensor, a $CH_4$ sensor, an $H_2$ sensor, or a soot sensor;
    measuring at least one actual exhaust gas value for each of the plurality of cylinders;
    comparing each respective measured actual exhaust gas value with a reference exhaust gas value to determine at least one cylinder-specific deviation between the reference exhaust gas value and the at least one actual exhaust gas value for each of the cylinders, wherein the reference exhaust gas value is based at least in part on a full load operation and a partial load operation operating point of the internal combustion engine;
    determining for each of the plurality of cylinders whether or not a misfire is occurring at a respective cylinder based at least in part on one of:
        the cylinder-specific deviation and
        every cylinder-specific deviation; and
    at least one of:
        interrupting a fuel supply to a respective misfire cylinder when a misfire occurs, and
        influencing an ignition time at a respective misfire cylinder when a misfire occurs, and
        influencing a fuel/air ratio at a respective misfire cylinder when a misfire occurs.

2. The method according to claim 1, wherein at least one of the at least one actual exhaust gas value and every actual exhaust gas value is measured by a respective at least one exhaust gas sensor at the exhaust gas outlet of each of the plurality of cylinders.

3. The method according to claim 2, wherein each respective actual exhaust gas value is acquired at a respective exhaust gas sensor of a respective cylinder exclusively in a cylinder-specific crankshaft angle range to minimize an interaction with exhaust gas expelled from other cylinders during a cylinder-specific acquisition of the at least one actual exhaust gas value.

4. The method according to claim 1, wherein at least one of the at least one actual exhaust gas value and every actual exhaust gas value is measured by a shared exhaust gas sensor for a plurality of cylinders.

5. The method according to claim 4, wherein the exhaust gas of exclusively one cylinder of the plurality of cylinders is supplied to the shared exhaust gas sensor to minimize an interaction with exhaust gas expelled from other of the plurality of cylinders during a cylinder-specific acquisition of the at least one actual exhaust gas value.

6. The method according to claim 1, wherein for every cylinder at least one of:
    an actual $NO_x$ value is acquired as the at least one actual exhaust gas value for every cylinder by the exhaust gas sensor configured as an $NO_x$ sensor,
    a fuel-air ratio is acquired as the at least one actual exhaust gas value for every cylinder by the exhaust gas sensor configured as a lambda sensor,
    residual oxygen content is acquired as the at least one actual exhaust gas value for every cylinder by the exhaust gas sensor configured as the lambda sensor, and
    and one or more of an actual $CH_4$ value, an actual particle value, an actual soot value, and an actual $H_2$ value is acquired as the at least one actual exhaust gas value.

7. The method according to claim 6, wherein a current measurement value of an actual combustion value is used as the at least one actual exhaust gas value.

8. The method according to claim 1, wherein one of an average value, a maximum value, a time integral, and an inflection point from measurements acquired over a measurement interval is used as the at least one actual exhaust gas value.

9. The method according to claim 1, wherein the reference exhaust gas value of a respective cylinder is based at least in part on the at least one actual exhaust gas value of at least one other cylinder.

10. The method according to claim 1, wherein the calibrating further comprises:
    calibrating a respective exhaust gas sensor by:
        applying a reference gas to the respective exhaust gas sensor to remove exhaust gas from the respective exhaust gas sensor,
        acquiring a measurement value acquired when the reference gas is applied to the respective exhaust gas sensor,
        calibrating the respective exhaust gas sensor based at least in part on the measurement,
        wherein after the calibration, exhaust gas is again applied to the respective exhaust gas sensor.

11. The method according to claim 1, wherein in a turbocharged engine a fluidic connection is produced downstream of a respective outlet of a cylinder but upstream of a confluence of a plurality of exhaust gases of other cylinders and downstream of at least one exhaust turbine, and the at least one respective sensor is arranged for determining the at least one actual exhaust gas value in this fluidic connection.

12. A method for cylinder-specific detection of misfires in an internal combustion engine having a plurality of cylinders and at least one exhaust gas sensor at an exhaust gas outlet of one or more of the plurality of cylinders, comprising:
controlling a respective valve for each of the plurality of cylinders so that the exhaust gas of exclusively one cylinder is supplied to a shared exhaust gas sensor, the shared exhaust gas sensor configured as one of an $NO_x$ sensor, a $CH_4$ sensor, an $H_2$ sensor, or a soot sensor;
measuring at least one actual exhaust gas value for each of the plurality of cylinders;
comparing each respective measured actual exhaust gas value with a reference exhaust gas value to determine at least one cylinder-specific deviation between the reference exhaust gas value and the at least one actual exhaust gas value for each of the cylinders, wherein the reference exhaust gas value is based at least in part on a full load operation and a partial load operation operating point of the internal combustion engine; and
determining for each of the plurality of cylinders whether or not a misfire is occurring at a respective cylinder based at least in part on one of:
the cylinder-specific deviation and
every cylinder-specific deviation; and
at least one of:
interrupting a fuel supply to a respective misfire cylinder when a misfire occurs, and
influencing an ignition time at a respective misfire cylinder when a misfire occurs, and
influencing a fuel/air ratio at a respective misfire cylinder when a misfire occurs.

* * * * *